United States Patent
Floersch et al.

(10) Patent No.: US 9,345,325 B2
(45) Date of Patent: May 24, 2016

(54) STACKABLE SHIM (71) Applicant: Target Brands, Inc., Minneapolis, MN (US)

(72) Inventors: David J. Floersch, Minneapolis, MN (US); James A. Duff, Omaha, NE (US)

(73) Assignee: Target Brands, Inc., Minneapolis, MN (US)

(*) Notice: Subject to any disclaimer, the term of this patent is extended or adjusted under 35 U.S.C. 154(b) by 82 days.

(21) Appl. No.: 14/164,395

(22) Filed: Jan. 27, 2014

(65) Prior Publication Data
US 2015/0208803 A1 Jul. 30, 2015

(51) Int. Cl.
| *A47B 91/00* | (2006.01) |
| *A47B 95/00* | (2006.01) |
| *A47B 91/12* | (2006.01) |
| *F16M 13/00* | (2006.01) |
| *B23P 19/04* | (2006.01) |
| *F16M 7/00* | (2006.01) |

(52) U.S. Cl.
CPC .............. *A47B 91/005* (2013.01); *A47B 91/12* (2013.01); *A47B 95/00* (2013.01); *B23P 19/04* (2013.01); *F16M 7/00* (2013.01); *F16M 13/00* (2013.01); *A47B 2220/0061* (2013.01); *F16M 2200/08* (2013.01); *Y10T 29/49826* (2015.01)

(58) Field of Classification Search
CPC ...... A47B 91/005; A47B 91/12; A47B 95/00; A47B 2220/0061; A47B 2220/0066; B23P 19/04; F16M 13/00; F16M 2200/08
USPC .............. 211/183; 248/188.2, 188.9, 346.01, 248/346.02, 346.05, 346.11; 254/88; 446/128; 482/141; 484/141; 52/126.1, 52/126.2, 126.3, 126.5, 126.6; D12/217; D8/374
See application file for complete search history.

(56) References Cited

U.S. PATENT DOCUMENTS

| 1,675,593 | A | | 7/1928 | Bohnsack | |
| 1,741,487 | A | * | 12/1929 | Vance | A47B 91/12 248/188.2 |
| 1,798,272 | A | * | 3/1931 | Phillips | A47B 91/04 248/188.2 |
| 2,366,867 | A | * | 1/1945 | Nichthauser | A47B 91/12 248/188.2 |
| 2,933,850 | A | * | 4/1960 | Martin | A47B 91/12 248/188.2 |
| 3,030,730 | A | | 4/1962 | Costar | |
| 4,002,315 | A | * | 1/1977 | Van Goubergen | F16F 3/093 248/633 |
| 4,076,202 | A | * | 2/1978 | McConnell | A47B 91/12 248/188.2 |

(Continued)

FOREIGN PATENT DOCUMENTS

EP 2311696 A1 4/2011

OTHER PUBLICATIONS

Office Action from Canadian Patent Application No. 2,846,995, mailed Jul. 14, 2014 (4 pages).

(Continued)

*Primary Examiner* — Joshua Rodden
(74) *Attorney, Agent, or Firm* — Leanne Taveggia Farrell; Westman, Champlin & Koehler, P.A.

(57) ABSTRACT

A shim includes a main body defined by a main body outer perimeter and having a first surface and an opposing second surface. A pocket is located within the main body outer perimeter and is recessed from the first surface to provide a support surface. A protrusion is defined by a protrusion outer perimeter and is located within the main body outer perimeter. The protrusion protrudes from the second surface to an engaging surface. A plurality of geometrically shaped cells are located within the protrusion outer perimeter and are recessed from the engaging surface.

16 Claims, 7 Drawing Sheets

(56) References Cited

U.S. PATENT DOCUMENTS

| | | | |
|---|---|---|---|
| 4,908,245 A | | 3/1990 | Shah et al. |
| 5,054,250 A * | | 10/1991 | Foss ............... E06B 1/6069 254/104 |
| 5,205,097 A * | | 4/1993 | Harvey ............. E02D 27/02 248/188.2 |
| 5,205,421 A | | 4/1993 | Bustos |
| D338,360 S * | | 8/1993 | Petersen ................ D8/374 |
| 5,433,327 A | | 7/1995 | Benvenuti et al. |
| 5,442,882 A * | | 8/1995 | Repasky ......... E04F 15/02464 248/188.4 |
| 5,640,813 A * | | 6/1997 | Glazik ............. E06B 1/6069 248/188.2 |
| 5,815,992 A | | 10/1998 | Wells et al. |
| 6,159,575 A * | | 12/2000 | Rathsack ........... E06B 1/6069 428/119 |
| 6,533,516 B2 * | | 3/2003 | Lemelin ............... B23Q 1/01 206/338 |
| 6,560,934 B1 * | | 5/2003 | Workman ............. F16M 7/00 248/188.2 |
| D485,746 S * | | 1/2004 | Abraham ................ D8/374 |
| 6,948,688 B1 | | 9/2005 | Payne et al. |
| 7,040,461 B2 * | | 5/2006 | Chrisco ............... B60T 3/00 188/32 |
| D531,378 S * | | 10/2006 | Angel .................... D34/31 |
| D531,568 S | | 11/2006 | Davidian |
| D565,748 S | | 4/2008 | Sorkin |
| D565,749 S | | 4/2008 | Sorkin |
| 7,386,955 B1 | | 6/2008 | Repasky |
| 7,416,166 B1 | | 8/2008 | Shaw |
| 7,527,229 B2 | | 5/2009 | Dabrowski |
| D650,924 S | | 12/2011 | Sorkin |
| 8,453,391 B2 * | | 6/2013 | Tabibnia ......... E04F 15/02452 248/188.2 |
| 9,033,293 B1 * | | 5/2015 | Glenn ............... A47B 91/005 248/188.2 |
| 2009/0247378 A1 * | | 10/2009 | Carlesimo ....... A63B 21/00047 482/141 |
| 2010/0252788 A1 | | 10/2010 | Wickwire |
| 2013/0219809 A1 * | | 8/2013 | Tabibnia ......... E04F 15/02464 52/126.6 |
| 2015/0135609 A1 * | | 5/2015 | Glynos ............. E04F 21/1877 52/126.3 |

OTHER PUBLICATIONS

Office Action from Canadian Patent Application No. 2,846,995, mailed Dec. 3, 2014 (7 pages).
Image of Shim, publicly available at least as early as Jun. 2006, 1 page.
Image of Shim, publicly available at least as early as Apr. 2008, 1 page.
Office Action from Canadian Patent Application No. 2,846,995, mailed Dec. 4, 2014 (7 pages).

* cited by examiner

STACKABLE SHIM

BACKGROUND

A shim is a thin piece of material used to fill small gaps or spaces between objects. In retail stores, floor shims are used to level gondola display units when floors are uneven. In addition, shims may be used as spacers or to fill gaps between parts subject to wear.

The discussion above is merely provided for general background information and is not intended to be used as an aid in determining the scope of the claimed subject matter.

SUMMARY

A shim includes a main body defined by a main body outer perimeter and having a first surface and an opposing second surface. A pocket is located within the main body outer perimeter and is recessed from the first surface to provide a support surface. A protrusion is defined by a protrusion outer perimeter and is located within the main body outer perimeter. The protrusion protrudes from the second surface to an engaging surface. A plurality of geometrically shaped cells are located within the protrusion outer perimeter and are recessed from the engaging surface.

A free-standing retail display fixture includes a base end bracket, a foot pad coupled to the base end bracket and a first shim structure having at least one shim. The at least one shim includes a first side having a recessed foot bed and a second side opposite the first side and having a protrusion that terminates at an engaging surface. The first shim structure is positioned under the foot pad on the base end bracket such that the foot bed of the at least one shim in the first shim structure receives the foot pad and the engaging surface of the at least one shim in the first shim structure contacts the floor.

A method of assembling a free-standing retail display fixture includes mounting the base bracket to an upright frame member and positioning at least one shim under the base bracket. The second side of the at least one shim has a plurality of adjoining cavities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF DRAWINGS

DETAILED DESCRIPTION

Described below are stackable shims for use in leveling gondola display fixtures in a retail store. Each shim includes a side having a recess and a side having a protrusion. The recess side of one shim receives the protruding side of another shim of the same type so as to stack multiple of the same shims together. In addition, the protruding side of each shim includes adjoining cavities or cells that provide the shim with greater load capability. When using the shim to level a gondola display fixture, the recess side faces up to receive a portion of the gondola display fixture or to face a portion of the gondola display fixture while the protruding side faces down to contact a floor. When using the shim to anchor a gondola display fixture to the floor, the protruding side faces up to receive an anchoring fastener and the recess side faces down to contact the floor.

Figure 1:
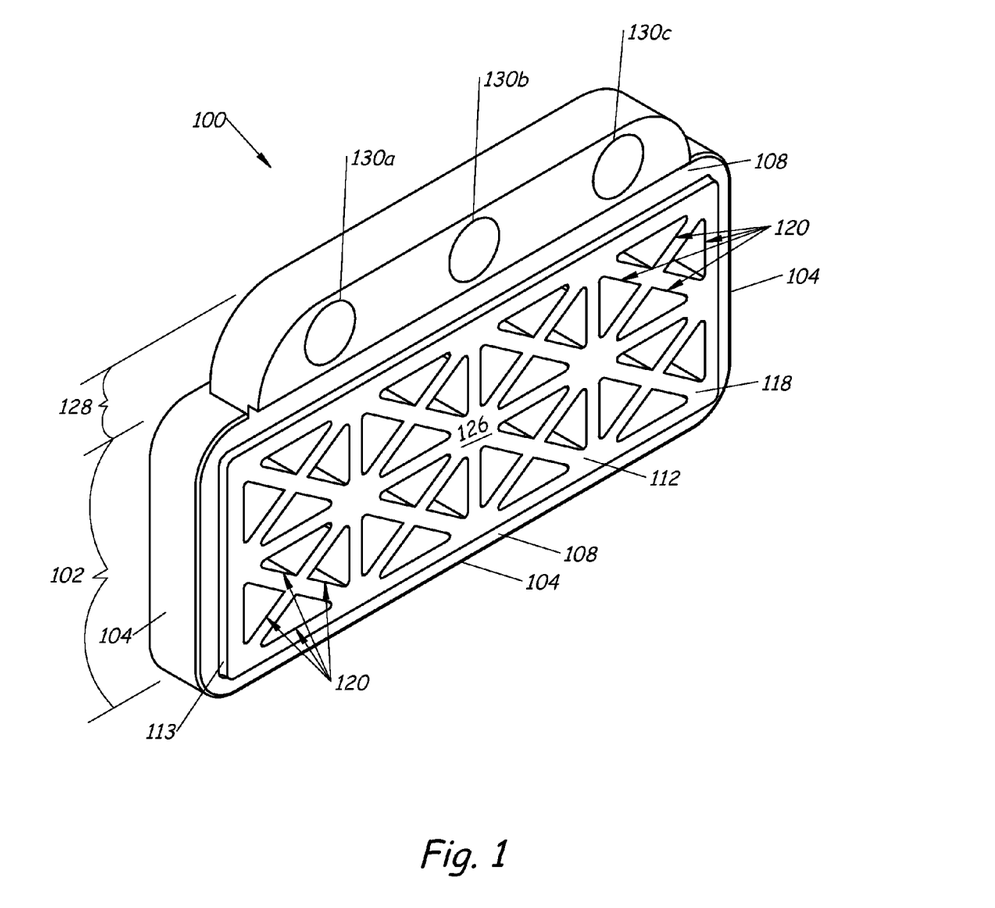
FIG. 1 is a perspective view of a shim according to one embodiment.

FIG. 1 is a perspective view of a representative shim or floor shim 100 according to one embodiment. While shim 100 is described below in terms of use for a floor, it should be realized that shim 100 can be used in other ways including to fill small gaps or spaces between objects for object placement or between objects that are subject to wear. FIGS. 2-6 illustrate orthogonal views of shim 100 including a top view, a bottom view, a front view, a back view and a left side view, respectively. The opposing right side view of shim 100 is a mirror image of the FIG. 6 left side view. Shim 100 includes a main body 102 defined by a main body outer perimeter 104 and having a first side 105 that includes a first surface 106 and a second side 107 that includes an opposing second surface 108. In one embodiment, first side 105 is a top side of shim 100 and second side 107 is a bottom side of shim 100. In another embodiment, first side 105 is a bottom side of shim 100 and second side 107 is a top side of shim 100.

Figure 3:
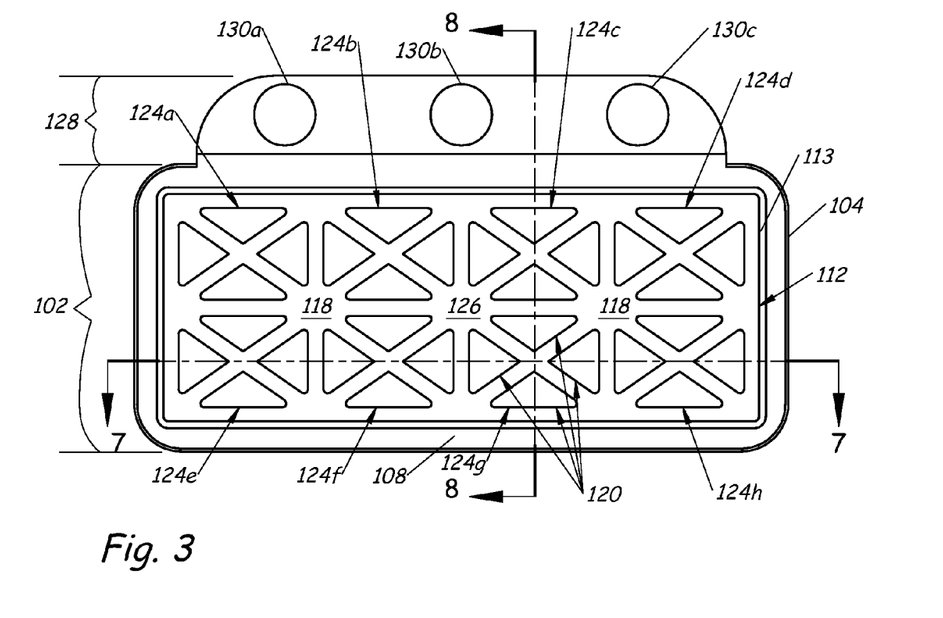
FIG. 3 is a bottom view of the shim illustrated in FIG. 1.
Figure 4:
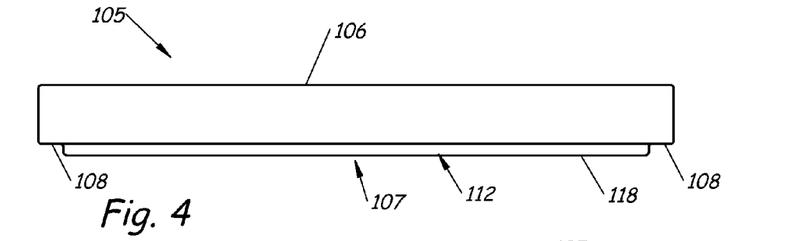
FIG. 4 is a front view of the shim illustrated in FIG. 1.
Figure 5:
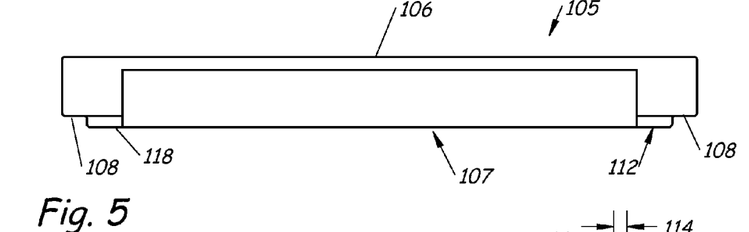
FIG. 5 is a back view of the shim illustrated in FIG. 1.
Figures 6, 8:
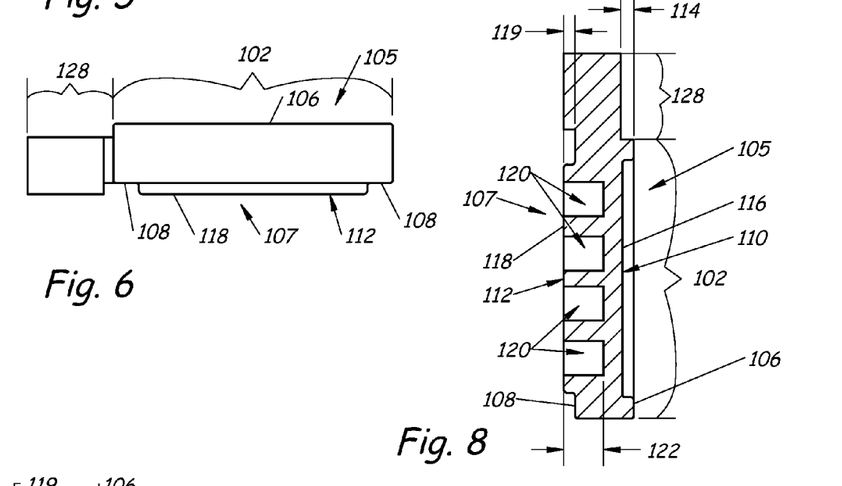
FIG. 6 is a side view of the shim illustrated in FIG. 1.
FIG. 8 is a section view of the shim illustrated in FIG. 1 taken through the line indicated in FIG. 3.
Figure 7:
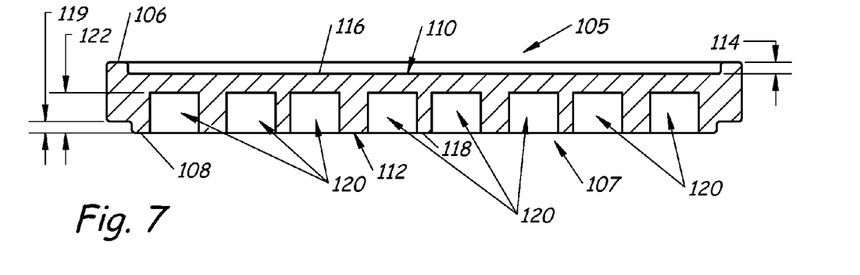
FIG. 7 is a section view of the shim illustrated in FIG. 1 taken through the line indicated in FIG. 3.

FIGS. 7 and 8 are sections views of shim 100 taken through the lines indicated in FIG. 3. As best illustrated in FIGS. 7 and 8, shim 100 includes a pocket or foot bed 110 located within main body outer perimeter 104 on first side 105 and a protrusion 112 located within main body outer perimeter 104 on second side 107. Protrusion 112 is defined by a protrusion outer perimeter 113 (FIG. 3). Pocket or foot bed 110 is recessed from first surface 106 by a pocket distance 114 to provide a support surface 116 and protrusion 112 protrudes from second surface 108 and terminates at an engaging surface 118 by a protrusion distance 119. Pocket distance 114 is substantially similar to protrusion distance 119 so that two identical shims 100 can be mated together so that an engaging surface 118 on one shim 100 contacts a support surface 116 on another shim 100 and second surface 108 on one shim 100 contacts first surface 106 on the other shim 100.

As illustrated in FIGS. 1, 3, 7 and 8, shim 100 also includes a plurality of geometrically shaped cells 120 located within protrusion outer perimeter 113 and being recessed from engaging surface 118. Each of the plurality of geometrically shaped cells 120 are recessed from engaging surface 118 by a cell distance 122. As illustrated in FIGS. 7 and 8, pocket distance 114 is less than cell distance 122.

In the embodiment illustrated in FIGS. 1-8, geometrically shaped cells 120 are triangular in shape and are grouped and arranged to form a latticework on engaging surface 118. Shim 100 includes groups 124 of four triangular-shaped cells 120. As denoted in FIG. 3, shim 100 includes eight groups 124a, 124b, 124c, 124d, 124e, 124f, 124g and 124h of four triangular-shaped cells. However, it should be realized that there can be any number of groups and any number of geometrically shaped cells (not just triangular cells) in each group. Between each geometrically shaped cell in each group and between each group forms the latticework on engaging surface 118. The combination of latticework and recessed cells provide shim 100 with an increased load capacity and in the case where multiple shims 100 are stacked together, a place for excess adhesive to be held.

As described and according to one embodiment, each of the groups 124a, 124b, 124c, 124d, 124e, 124f, 124g and 124h of cells 120 includes four triangular-shaped cells 120. A first two of the four of the triangular-shaped cells are substantially similar in dimension and a second two of the four of the triangular-shaped cells are substantially similar in dimensions. More specifically, the first two of the four triangular-shaped cells include three sides that are all substantially the same in dimension and are oriented at substantially equal angles from each other to form equilateral triangles. The second two of the four triangular-shaped cells include two sides that are substantially the same in dimension and two substantially equal angles to form isosceles triangles. In each group, the first two of the four triangular-shaped cells minor each other and the second two of the four triangular-shaped cells mirror each other such that triangular cells 120 are arranged symmetrically adjacent to each other.

Shim 100 also includes an anchoring area 126. Anchoring area 126 is centrally located on engaging surface 118 of protrusion 112 and therefore centrally located on second side 107 of main body 102. In other words, anchoring area 126 is in the middle of and surrounded by the groups of four triangular-shaped cells. Anchoring area 126 will be discussed in more detail below, but is the main location where shim 100 can receive an anchor for anchoring shim 100 to a floor.

Figure 2:
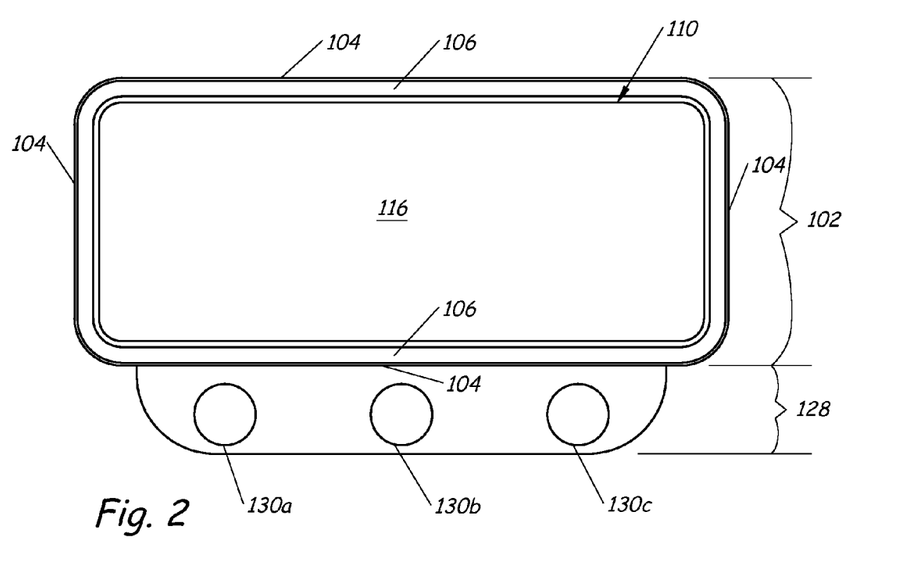
FIG. 2 is a top view of the shim illustrated in FIG. 1.

Shim 100 also includes a flange 128 extending from a side of main body 102. Flange 128 includes a plurality of through holes 130a, 130b and 130c. While FIGS. 1-3 illustrate flange 128 with three through holes 130a, 130b and 130c, flange 128 can include any number. Flange 128 provides additional space for optionally anchoring shim 100 with anchor fasteners to a floor.

Figure 9:
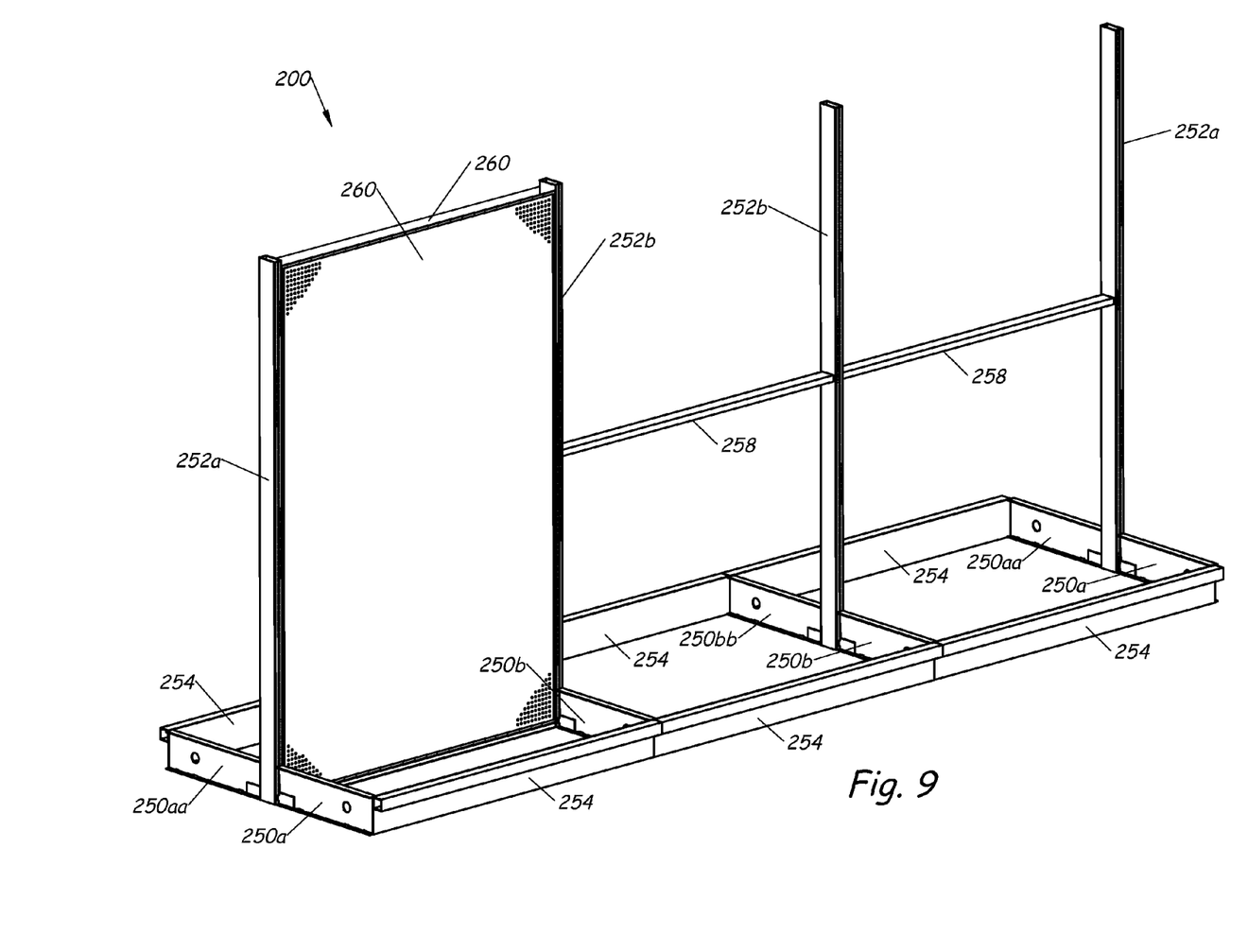
FIG. 9 is a perspective view of a run of gondola display fixtures being assembled.

FIG. 9 is a perspective view of a gondola display fixture 200 that is being assembled and in need of shims for leveling. The gondola display fixture 200 illustrated in FIG. 9 is a gondola island run. However, it should be realized that the shim 100 described above can be used to level other types of gondola display fixtures including runs of gondola wall fixtures and gondola end caps as well as other types of display fixtures and other types of structural applications where leveling, gap filling or wear protection is needed. Since gondola display fixture 200 is a gondola island run, fixture 200 includes at least four base end brackets 250 (fixture 200 has eight), at least a pair of upright frame members 252 (fixture 200 has four), at least two base fronts 254 (fixture 200 has six), at least one center rail 258 (fixture 200 has three, but only two are visible) and at least one upright panel 260 (fixture 200 has six, but only two are illustrated).

For fixture 200, the two opposing base end brackets 250a and 250aa or 250b and 250bb are mounted to upright frame member 252a or 252b such that upright frame member 252a or 252b is located between two base end brackets 250a and 250aa or 250b and 250bb and is substantially vertically extending upwardly from base end brackets 250a and 250aa or 250b and 250bb. Each base front 254 connects two adjacent base end brackets 250a and 250b, 250b and 250b, 250aa and 250bb or 250bb and 250bb together. Each center rail 258 is supported by and extends between two upright frame members 252a and 252b or 252b and 252b. Upright panel 260 is located between and is supported by two upright frame members 252a and 252b or 252b and 252b and is additionally supported by one of the center rails 258. Each upright panel 260 is substantially vertically oriented and extends from a bottom rail to a top of the two upright frame members 252a and 252b or 252b and 252b. In addition, each base end bracket 250a, 250b, 250aa and 250bb includes a foot pad 262 (262a and 262aa in FIG. 12) located on a bottom of the base end bracket at a position distal from the upright frame member 252a or 252b that the base end bracket is mounted to.

As part of installing fixture 200, fixture 200 is leveled by identifying which of the assembled base end bracket(s) and corresponding upright frame member is the highest. Shims are then placed under the other base end brackets and corresponding upright frame members to bring the other base end brackets and corresponding upright frame members up to the same level as the highest base end bracket(s) and corresponding upright frame member. For example, fixture 200 has two end upright frame members 252a located at opposing ends and two intermediate upright frame members 252b located between the end upright frame members 252a. If the two intermediate upright frame members 252b are higher than the end upright frame members 252a, then the assembled end upright frame members 252a and corresponding intermediate base end brackets 250a and 250aa will have to be raised to match the height of the intermediate upright frame members 252b.

In the above example, before introducing a shim or a plurality of shims that are arranged into a stack to fixture 200, it needs to be determined how much (or how high) each end upright frame member 252a in the run needs to be raised to align horizontally with each intermediate upright frame member 252b in the run. After determining the height needed, one or more shims 100 can be prepared accordingly.

Figure 10:
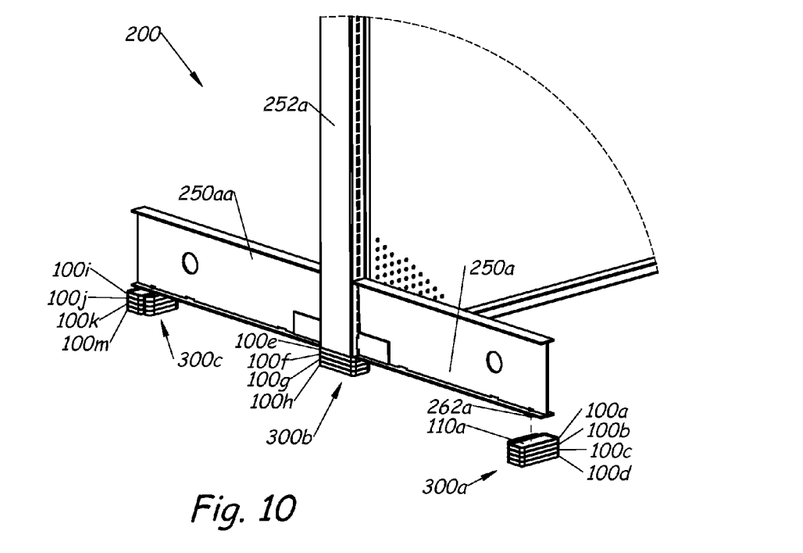
FIG. 10 is a perspective view of a portion of a gondola display fixture being leveled with stacks of the shims illustrated in FIG. 1 according to one embodiment.

According to one embodiment, FIG. 10 is a perspective view of a portion of gondola display fixture 200 being leveled with shim structures or shim stacks 300a, 300b and 300c each containing multiple of the representative shim 100 illustrated in FIG. 1. Representative shim 100, which is illustrated in FIGS. 1-8 in detail, is stackable or capable of being mated with other like shims 100. In exemplary FIG. 10, it was determined that each shim structure or stack 300a, 300b and 300c needs four representative shims 100 to level the illustrated portion (i.e., intermediate base end brackets 250a and 250aa and intermediate upright frame member 252a) of fixture 200. As illustrated, shim structure or stack 300a includes identical shims 100a, 100b, 100c and 100d. Shim structure or stack 300b includes identical shims 100e, 100f, 100g and 100h. Shim structure or stack 300c includes identical shims 100i, 100j, 100k and 100. In addition, each shim 100a, 100b, 100c and 100d is identical to each shim 100e, 100f, 100g and 100h as well as identical to each shim 100i, 100j, 100k and 100m.

However, in other instances, it may be that each shim structure 300a, 300b and 300c only requires a single representative shim 100 or other amount of shims 100 to level fixture 200. With reference back to FIGS. 1-8 and in a single shim embodiment, shim structure 300a can include single floor shim 100 positioned under foot pad 262 of fixture 200 such that foot bed 110 receives foot pad 262 and engaging surface 118 is in contact with the floor. Shim structure 300c can include a single floor shim 100 positioned under foot pad 262 of fixture 200 such that foot bed 110 receives foot pad 262 and engaging surface 118 is in contact with the floor. Shim structure 300b can include a single floor shim 100 positioned under upright frame member 252a of fixture 200 such that foot bed 110 faces a bottom of upright frame member 252a and engaging surface 118 is in contact with the floor.

Figure 11:
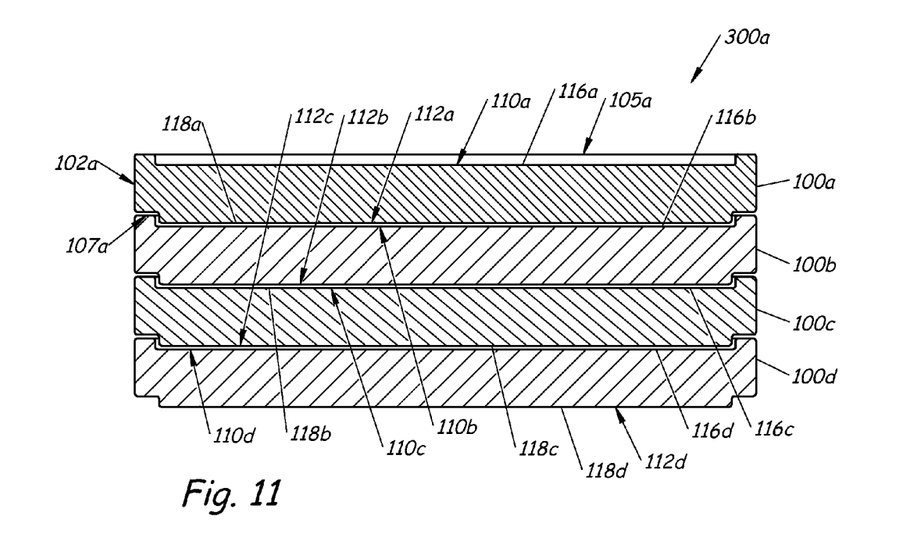
FIG. 11 is an enlarged section view of a shim stack including four shims.

With reference back to the embodiment illustrated in FIG. 10, FIG. 11 illustrates an enlarged section view of shim structure or stack 300a including all four shims 100a, 100b, 100c and 100d. As discussed above, it is possible that shim structure or stack 300a, shim structure or stack 300b and shim structure or stack 300c may include only one shim 100a, one shim 100e and one shim 100i, respectively. In FIG. 11, the at least one shim 100a (as would 100e and 100i for shim structures or stacks 300b and 300c) includes a main body 102a having a first side 105a having a foot bed 110a with a support surface 116a and a second side 107a having a protrusion 112a that terminates at an engaging surface 118a.

In the alternative and as illustrated in FIG. 11, shim stack 300a can include not only shim 100a, but also shims 100b, 100c and 100d. Each additional shim 100b, 100c and 100d includes a main body (102b, 102c, 102d) including a first side (105b, 105d, 105d) having a foot bed (110b, 110c, 110d) with a support surface (116b, 116c, 116d) and a second side (107b, 107c, 107d) opposite the first side (105b, 105c, 105d) and including a protrusion (112b, 112c, 112d) that terminates at an engaging surface (118b, 118c, 118d).

In this multiple shim stack embodiment, engaging surface 118a of uppermost shim 100a mates with foot bed 110b and contacts support surface 116b, engaging surface 118b of intermediate shim 100b mates with foot bed 110c and contacts support surface 116c and engaging surface 110c of intermediate shim 100c mates with foot bed 110d and contacts support surface 116d of lowermost shim 100d. The stack of mated shims 100a, 100b, 100c and 100d are positioned under foot pad 262a of fixture 200 such that foot bed 110a of uppermost shim 100a receives foot pad 262a by placing foot pad 262a in contact with support surface 116a and engaging surface 118d of lowermost shim 100d in contact with the floor.

Further and as discussed in regards to FIGS. 1-8, protrusions 112a, 112b, 112c and 112d on each shim 100a, 100b, 100c and 100d include a plurality of adjoining cavities (like adjoining cavities 120 illustrated in FIGS. 1, 3, 7 and 8) recessed from engaging surfaces 118a, 118b, 118c and 118d, respectively. Adjoining cavities provide shims 100a, 100b, 100c and 100d with greater load capability. While a stack of shims need not be mechanically fastened together other than mated together as illustrated in FIG. 11, each stack of shims 300a, 300b and 300c can be further secured together using adhesive. More specifically, adhesive (not illustrated) can be placed between engaging surface 118a and support surface 116b, between engaging surface 118b and support surface 116c and between engaging surface 118c and support surface 116d such that shims 100a, 100b, 100c and 100d are all adhered together. In this way, adjoining cavities in protrusions 112a, 112b and 112c provide space for excess adhesive to be held.

Figure 12:
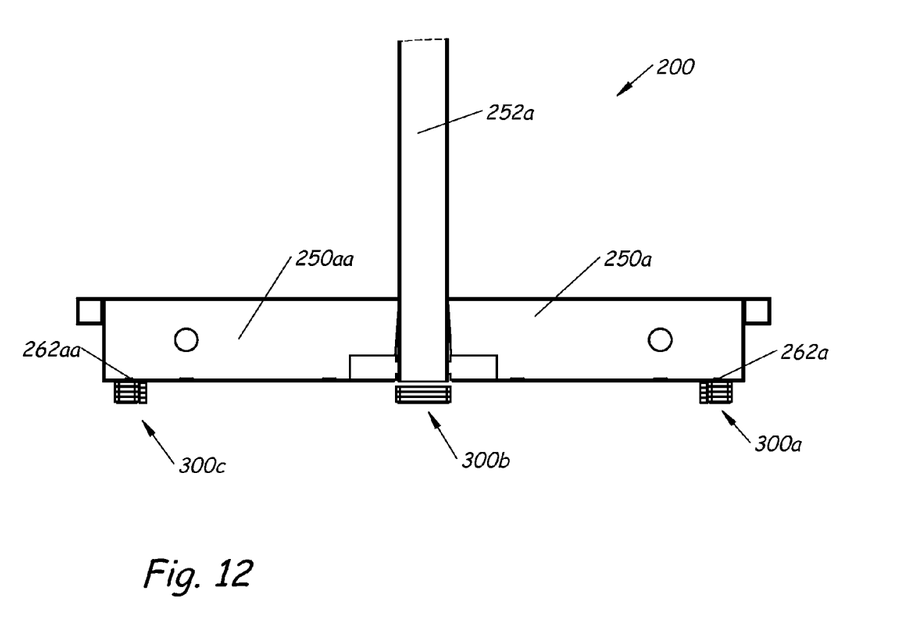
FIG. 12 is a side view of FIG. 10.

With reference back to FIG. 10 and in regards to FIG. 12, which illustrates a side view of FIG. 10, shim structure 300a of multiple shims 100a, 100b, 100c and 100d is positioned under foot pad 262a of end base end bracket 250a, shim structure 300b of multiple shims 100e, 100f, 100g and 100h is positioned under a bottom of end upright frame member 252a and shim structure 300c of multiple shims 100i, 100j, 100k and 100m is positioned under a foot pad 262aa of end base end bracket 250aa. In this way, foot bed 110a of uppermost shim 100a receives foot pad 262a, the foot bed of uppermost shim 100e at least faces the bottom of end upright frame member 252a, the foot bed of shim 100i receives foot pad 262aa and engaging surface 118d of lowermost floor shim 100d, the engaging surface of lowermost floor shim 100h and the engaging surface of lowermost shim 100m all contact the floor.

Uppermost shim 100e in shim structure or stack 300b does not necessarily engage with upright member 252a in an unloaded state. As illustrated in FIG. 12, a gap is desirable to prevent fixture 200 from rocking back and forth prior to being loaded with merchandise. Upon being loaded, upright frame member 252a will contact shim structure or stack 300b or in other words, the foot bed of uppermost floor shim 100e will receive the bottom of upright frame member 252a.

Figure 13:
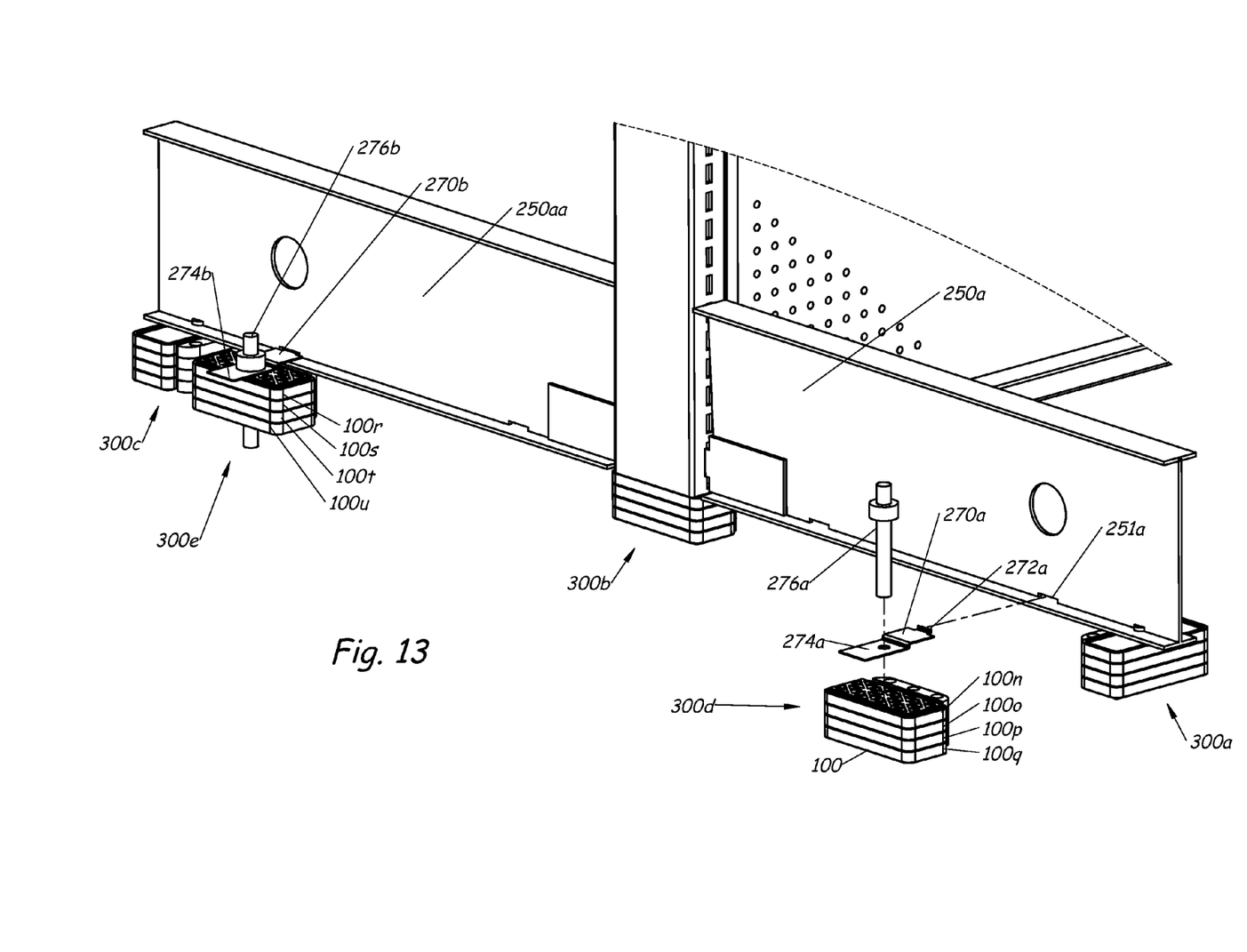
FIG. 13 is an enlarged perspective view of the same portion of the gondola display fixture illustrated in FIG. 10 with the addition of the gondola display fixture being anchored to a floor according to one embodiment.

FIG. 13 is a perspective view of fixture 200 having been leveled with shin structures or shim stacks 300a, 300b and 300c and further being anchored to the floor. According to one embodiment, fixture 200 includes at least one anchor bracket 270 for use in anchoring fixture 200 to the floor. In FIG. 13, fixture 200 includes anchor bracket 270a and anchor bracket 270b. A first end of each anchor bracket 270a and 270b includes a flange 272a (only the flange of anchor bracket 270a is shown) that fits within an aperture 251a (only the aperture in base end bracket 252a is shown) of base end brackets 250a and 250aa and is thereby coupled to each base end bracket 250a and 250aa. A second end of each anchor bracket 270a and 270b includes a flange 274a and 274b with a hole for receiving an anchoring fastener 276a and 276b.

One or more shims 100 are assembled into shim structures or stacks to fit under flanges 274a and 274b of anchor brackets 270a and 270b. Each shim in the assembled shim structures or shim stacks are identical to each shim in shim structures or shim stacks 300a, 300b and 300c. For example and as illustrated in FIG. 13, shim structures or shim stacks 300d and 300e are prepared for fitting under anchor bracket 270a and 270b. The number of shims in shim structures or shim stacks 300d and 300e are selected so that anchor bracket 270 remains as level as possible when secured to the floor through the shim structure or stack. In FIG. 13, shim stack structure or stack 300d includes shims 100n, 100o, 100p and 100q and shim structure or stack 300e includes shims 100r, 100s, 100t and 100u. Shims 100n, 100o, 100p and 100q mate together in the same manner as the shims in shim structure or stack 300a illustrated in FIG. 11 and shims 100r, 100s, 100t and 100u mate together in the same manner as the shims in shim structure or stack 300a illustrated in FIG. 11.

Rather than an engaging surface of a second side of lowermost shims 100q and 100u contacting the floor, a first side of lowermost shims 100q and 100u contacts the floor. In other words, relative to shim stacks 300a, 300b and 300c, shim stacks 300d and 300e are inverted so that an engaging surface 118 of a second side 107 of uppermost shims 100n and 100r face up. Each shim in shim stacks 300d and 300e mate together and are adhered together as described with reference to FIG. 11. Shim stack 300d is positioned under flange 274a of anchor bracket 270a (with engaging surface 118 of uppermost shim 100n facing up) and shim stack 300e is positioned under flange 274b of anchor bracket 270b (with engaging surface 118 of uppermost shim 100r facing up).

A hole is drilled through each shim in shim structures or stacks 300d and 300e at anchoring area 126 (described with reference to FIGS. 1 and 3) to accommodate either anchoring fastener 276a or 276b. Anchoring fasteners 276a and 276b will couple base end bracket 250a or 250aa to the floor by extending through the stack of shims at the anchoring area 126 and by embedding an end of fastener 276a or 276b into the floor. In accordance with one embodiment, fasteners 276a and 276b include a bolt with two threaded ends, a nut and a washer. One of the threaded ends of each bolt passes through the stack of shims 300d or 300e and is screwed to the floor. A washer is placed over the other threaded end of each bolt and a nut is threaded onto the bolt and is tightened to secure flange 274a or 274b and the base end bracket 250a or 250aa to the shims, which are secured to the floor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A shim comprising:
   a main body defined by a main body outer perimeter and having a first surface and an opposing second surface;
   a pocket located within the main body outer perimeter and being recessed from the first surface to provide a support surface;
   a protrusion defined by a protrusion outer perimeter and located within the main body outer perimeter, the protrusion protruding from the second surface to an engaging surface;
   a plurality of geometrically shaped cells located within the protrusion outer perimeter and being recessed from the engaging surface to a recessed surface to provide the main body with increased load capacity; and
   a flange extending from a side of the main body and having a first surface that is recessed from the first surface of the main body and an opposing second surface that is in planar alignment with the engaging surface of the protrusion, the flange including a plurality of through holes for receiving optional anchors for anchoring the shim to a floor.

2. The shim of claim 1, wherein the pocket is recessed from the first surface to the support surface by a pocket distance.

3. The shim of claim 2, wherein each of the plurality of geometrically shaped cells is recessed from the engaging surface of the protrusion to the recessed surface by a cell distance.

4. The shim of claim 2, wherein the protrusion protrudes from the second surface to the engaging surface by a protrusion distance, wherein the protrusion distance is substantially similar to the pocket distance.

5. The shim of claim 1, wherein the plurality of geometrically shaped cells comprise triangular shaped cells.

6. The shim of claim 1, wherein the plurality of geometrically shaped cells are grouped to form a latticework on the engaging surface.

7. The shim of claim 1, wherein the main body of the shim comprises an anchoring area centrally located on the engaging surface of the protrusion, wherein the anchoring area is surrounded by the plurality of geometrically shaped cells.

8. A shim comprising:
   a main body defined by a main body outer perimeter and having a first side with a first surface and a second side opposite the first side with a second surface;
   a single recessed foot bed that is recessed from the first surface to a support surface by a foot bed distance;
   a single protrusion that protrudes from the second surface to an engaging surface by a protrusion distance, wherein the protrusion distance corresponds with the foot bed distance so the single protrusion mates with the single recessed foot bed of another substantially identical shim and therefore the engaging surface of the protrusion is positioned adjacent to the support surface of the recessed foot bed; and
   a plurality of geometrically shaped cells recessed from the engaging surface of the single protrusion to recessed surfaces, wherein each recessed surface is located between the second surface of the main body and the support surface of the recessed foot bed.

9. The shim of claim 8, further comprising an anchoring area centrally located on the engaging surface of the protrusion and being surrounded by the plurality of geometrically shaped cells recessed from the engaging surface, the anchoring area configured to receive an anchor fastener for anchoring the shim to a floor.

10. The shim of claim 8, further comprising a flange extending outwardly from the main body and having a first surface that is recessed from the first surface of the first side of the main body and an opposing second surface that is in planar alignment with the engaging surface of the protrusion, wherein the flange includes a plurality of through holes for receiving optional anchors for anchoring the shim to a floor.

11. A shim structure comprising:
   a stack of shims that mate together, each shim including a first side having a first surface and a second side opposite the first side having a second surface and each shim further comprising:
      a single recessed foot bed that is recessed from the first surface to a support surface by a foot bed distance;
      a single protrusion that protrudes from the second surface to an engaging surface by a protrusion distance;
      a plurality of adjoining cavities recessed from the engaging surface of the single protrusion to recessed surfaces to provide increased load capacity, wherein each recessed surface is located between the second surface of each shim and the support surface of the recessed foot bed;
   wherein the protrusion distance of each shim is substantially similar to the foot bed distance of each shim so the single protrusion of each shim mates with the single recessed foot bed of another substantially identical shim and therefore the engaging surface of the protrusion is positioned adjacent to the support surface of the recessed foot bed;
   wherein the stack of shims are positioned such that the support surface of an uppermost shim in the stack of shims faces up and the engaging surface of the uppermost shim in the stack of shims engages with the support surface of a shim below the uppermost shim; and
   wherein the engaging surface of a lowermost shim in the stack of shims faces down and the support surface of the lowermost shim in the stack of shims mates with the engaging surface of a shim above the lowermost shim.

12. The shim structure of claim 11, wherein the plurality of adjoining cavities recessed from the engaging surface of each shim comprise triangular shaped cavities.

13. The shim structure of claim 11, wherein the plurality of adjoining cavities recessed from the engaging surface of each shim are grouped to form a latticework on the engaging surface of each shim.

14. The shim structure of claim 11, wherein each shim further comprises an anchoring area centrally located on the engaging surface of the protrusion and being surrounded by the plurality of adjoining cavities recessed from the engaging surface of each shim, the anchoring area of each shim configured to receive an anchor fastener for anchoring at least the stack of shims to the floor.

15. The shim structure of claim 11, wherein each shim further comprises a flange extending from an end of each shim and comprising:
- a first surface that is recessed from the first surface of the first side of the main body;
- an opposing second surface that is in planar alignment with the engaging surface of the protrusion; and
- a plurality of through holes extending through the flange for receiving optional anchors for anchoring the stack of shims to a floor.

16. The shim structure of claim 11, wherein the shims in the stack of shims are adhered together.

* * * * *